L. M. SILVA.
BICYCLE.
APPLICATION FILED JUNE 15, 1908.

902,920.

Patented Nov. 3, 1908.

2 SHEETS—SHEET 1.

Witnesses

Inventor
Luis Martinez Silva
By Foster Freeman Watson Coit
Attorneys

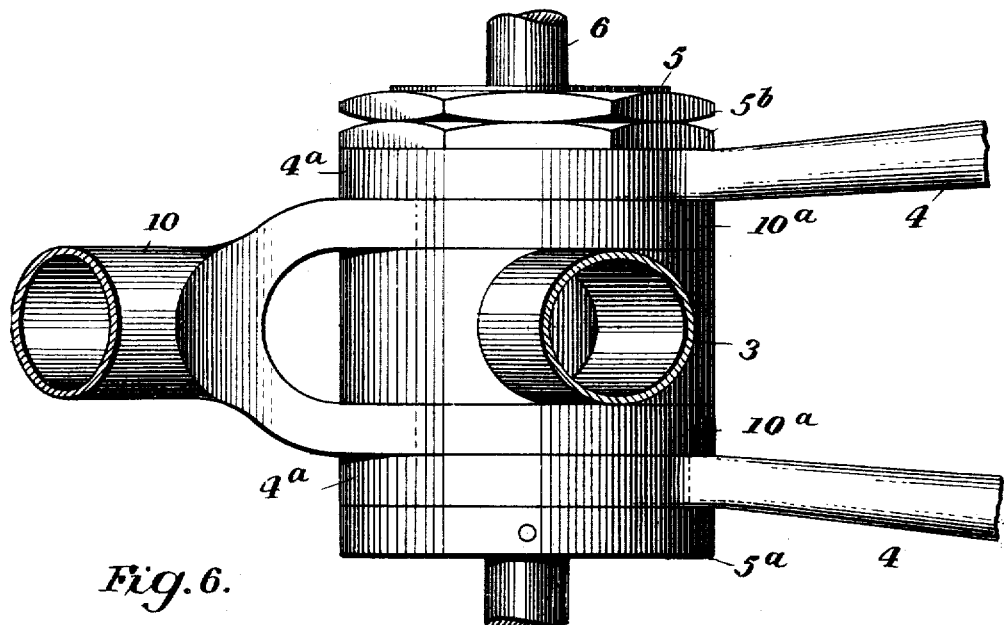
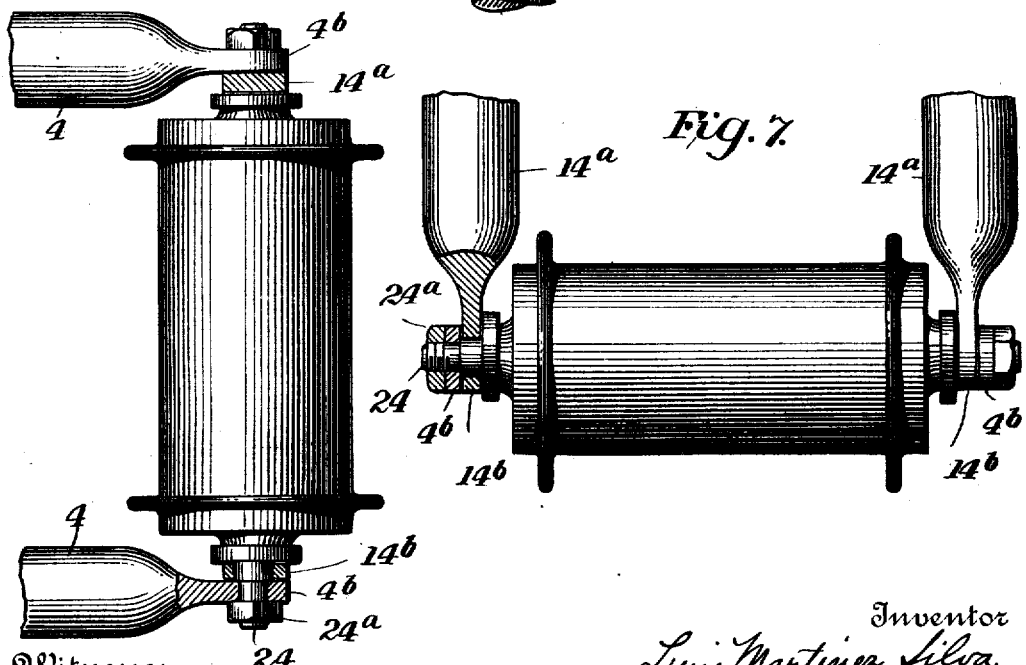

UNITED STATES PATENT OFFICE.

LUIS MARTINEZ SILVA, OF BOGOTA, COLOMBIA.

BICYCLE.

No. 902,920.

Specification of Letters Patent.

Patented Nov. 3, 1908.

Application filed June 15, 1908. Serial No. 438,632.

*To all whom it may concern:*

Be it known that I, LUIS MARTINEZ SILVA, a citizen of the Republic of Colombia, and residing at Bogota, Colombia, have invented certain new and useful Improvements in Bicycles, of which the following is a specification.

The present invention relates to improvements in bicycles and particularly to the construction of the frame whereby the strains and jars commonly experienced when passing over rough surfaces will be reduced to a minimum.

Figure 1:
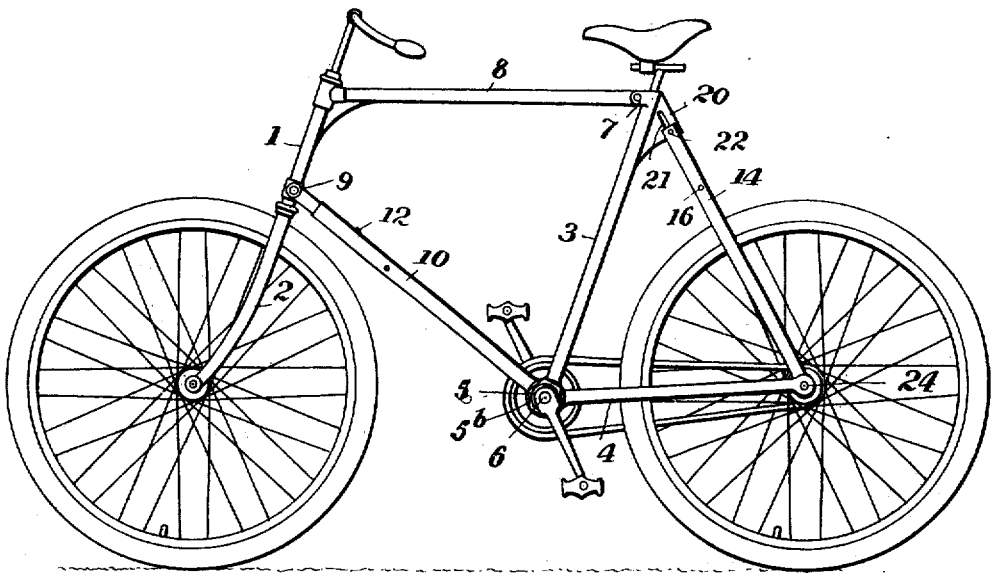
Figure 4:
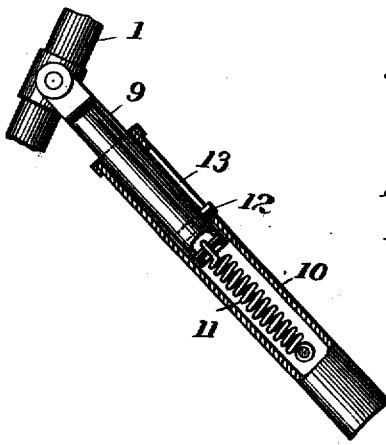
Figure 2:
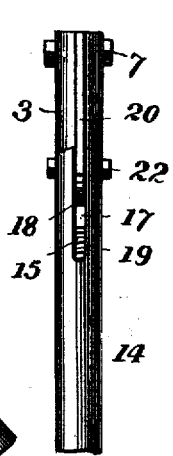
Figure 3:
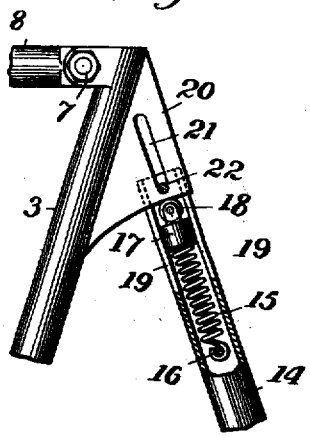

The invention will be described in connection with the accompanying drawing, in which, Figure 1 is a side elevation of a bicycle constructed in accordance with the present invention; Fig. 2 is a rear elevation, on an enlarged scale, of the upper end of the saddle post standard and brace connecting said standard with the rear wheel fork; Fig. 3 is a side elevation of the same; Fig. 4 is a detail view of a portion of the brace connecting the head piece of the frame with the saddle post standard; Fig. 5 is a plan view of the joints of the frame at the crank shaft bearing; Fig. 6 is a plan view of the joints of the frame at the axle; and Fig. 7 is a rear view of the same.

Referring to the drawing it will be seen that the frame is of the style or form commonly employed comprising a head 1, a front wheel fork 2, saddle post supporting standard 3, and rear wheel braces 4. The lower end of the standard 3 is connected in any desired manner with the barrel or bearing 5 for the crank shaft 6. At or near its upper end the standard 3 is provided with forwardly extending ears 7 to which is pivotally connected the rear end of the top brace 8 extending rearwardly from the head 1.

The head 1 and the lower end of the saddle post standard 3 are connected by a longitudinally extensible brace or connecting rod comprising two telescoping members 9, 10, pivotally connected, respectively, to the head 1 and crank shaft bearing 5, and themselves connected by a coiled spring 11. As shown in Fig. 4, the member 10 is preferably made tubular or provided with a socket to receive the spring 11 and the member 9, the latter having a laterally projecting stud or pin 12 that projects through a slot 13 in the member 10 to limit the relative movement of the parts. The spring 11 acts to hold the members 9, 10, in such relation that the pin 12 is normally at the rear or lower end of the slot 13 but is adapted to yield and permit the member 9 to move outwardly and vertically when the front wheel fork and head are shifted vertically as the wheel passes over an uneven surface. The member 10 is preferably forked at its rear end, the branches of the fork having eyes 10ª which surround and are free to pivot or hinge on the barrel 5, as shown in Fig. 5. The rear fork 14 has two branches 14ª (Fig. 7) provided with eyes 14ᵇ which surround and are freely pivoted on the rear axle 24.

In a socket at the upper end of the fork 14, or within the upper portion thereof, if it be made of tubing as is customary, is mounted a coiled spring 15. The lower end of this spring engages a pin or abutment 16 within the brace and over its upper end is fitted a cap 17 that supports an anti-friction roller 18. Said roller 18 is in line with two slots 19 formed in the upper end of the fork 14 and through which extends a fin or web 20 on the saddle post standard 3. The lower edge of said web 20 rides on the roller 18 and the web is provided with a slot 21 through which a pin 22 extends, the ends of which are supported by the brace 14.

The rear braces 4 are provided with eyes 4ª which surround and are freely pivoted on the hub or barrel 5 of the crank shaft bearing, as shown in Fig. 5. The rear ends of the braces 4 are provided with eyes 4ᵇ through which the ends of the rear axle pass and these eyes are preferably clamped tightly against shoulders on the rear axle by nuts 24ª. The eyes 4ª and 10ª of the braces 4 and 10 are confined on the hub or barrel 5 of the crank shaft bearing between a fixed collar 5ª and suitable lock nuts 5ᵇ, the lock nuts being normally set so that the braces 4 and 10 will be free to hinge upon the hub or barrel 5.

The operation and some of the advantages of the frame herein described may be briefly stated as follows: In case the bicycle is moving over a level surface and the parts are in normal position, the springs 10, 15, and parts coöperating therewith will occupy approximately the relative positions shown, the load on the saddle partially compressing the rear spring and distending the forward spring. When the front wheel strikes an obstruction the section of the frame comprising the fork 2, head 1, and brace 8, will be raised somewhat, turning about the pivotal connection between the rod 8 and lugs 7 on the saddle post standard 3. This movement will cause the brace member 9 to move outwardly and thereby the spring 11 will stretch or lengthen, thus relieving the frame members and the rider from shock. The spring 15 will also act to cushion the jar or blow thus produced. If the rear wheel strikes an obstruction it will swing or rock about its pivotal connection with the crank shaft bearing and the effect will be to further compress the spring 15 without jarring or straining the frame or transmitting much movement to the saddle. By constructing the frame in the manner described, it is not necessary to employ pneumatic tires for the wheels although they may be used if desired.

It will be understood that the driving devices, saddle, handle bars, etc., as well as the detail construction of the several frame members are illustrated more or less conventionally in the drawing, the essential features of the invention being, however, clearly shown.

Having thus described the invention, what is claimed is:

1. A spring frame for a bicycle comprising a saddle post standard extending from the crank shaft to the saddle post and provided at its upper end with a rearwardly extending web having a slot therein, a fork extending from the rear axle to said web, said fork having a slot through which the web passes, a spring inclosed in the fork upon which the web is supported, a pin extending through the fork and the slot in the web, and braces extending from the crank shaft to the rear axle, said braces having a pivotal connection at the lower end of the saddle post standard and said fork having a pivotal connection with the rear ends of the braces, as and for the purpose set forth.

2. A spring frame for a bicycle comprising a saddle post standard extending from the crank shaft to the saddle post and provided at its upper end with a rearwardly extending web having a slot therein, a fork extending from the rear axle to said web, said fork having a slot through which the web passes, a spring inclosed in the fork, a cap resting on said spring and an antifriction roller carried by said cap and upon which the web is supported, a pin extending through the fork and the slot in the web, and braces extending from the crank shaft to the rear axle, said braces having a pivotal connection at the lower end of the saddle post standard and said fork having a pivotal connection with the rear ends of the braces, as and for the purpose set forth.

3. A spring frame for a bicycle comprising a head, front fork and top brace rigidly connected together, a saddle post standard at the upper end of which the top brace is pivoted, and a lower brace pivotally connected with the head and with the lower end of the saddle post standard, said lower brace comprising telescoping members having a pin and slot connection, and a pull spring connected to said members respectively and adapted to be distended as the front wheel passes over an obstruction.

4. The herein described bicycle frame comprising the saddle post standard having a rearwardly extending web at its upper end, the rear fork slotted to receive said web and provided with a spring upon which the web rests, the front fork, head and top brace rigidly connected together, the lower extensible brace having the members 9 and 10 connected by an extensible spring, and the lower rear braces 4, the top brace being pivotally connected with the seat post standard, the lower extensible brace being pivotally connected at its forward and rear ends, the lower rear braces being connected pivotally at their forward ends with the seat post standard and at their rear ends with the rear fork.

In testimony whereof I affix my signature in presence of two witnesses.

LUIS MARTINEZ SILVA.

Witnesses:
  JAMES A. WATSON,
  JOHN CROSSLEY.